United States Patent
Dong et al.

(10) Patent No.: US 7,503,173 B2
(45) Date of Patent: Mar. 17, 2009

(54) CONTROL DEVICES FOR SWASHPLATE TYPE VARIABLE DISPLACEMENT PISTON PUMP

(75) Inventors: Xingen Dong, Greeneville, TN (US); William Power, Greeneville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 311 days.

(21) Appl. No.: 11/348,093

(22) Filed: Feb. 6, 2006

(65) Prior Publication Data

US 2006/0174614 A1   Aug. 10, 2006

Related U.S. Application Data

(60) Provisional application No. 60/650,871, filed on Feb. 8, 2005.

(51) Int. Cl.
  *F16D 31/02* (2006.01)
(52) U.S. Cl. .................. 60/444; 91/216 A; 91/375 R; 91/506; 92/12.2; 92/71; 92/131
(58) Field of Classification Search .................. 60/443, 60/444; 91/216 A, 375 R, 506; 92/12.2, 92/57, 71, 130 R, 131
  See application file for complete search history.

(56) References Cited

U.S. PATENT DOCUMENTS

| | | | | |
|---|---|---|---|---|
| 2,662,375 | A | * | 12/1953 | Postel et al. .................. 60/490 |
| 3,332,323 | A | * | 7/1967 | Roeske .................. 92/12.2 |
| 3,579,988 | A | | 5/1971 | Firth et al. |
| 3,587,765 | A | * | 6/1971 | McFarland .................. 60/444 |
| 3,631,763 | A | * | 1/1972 | Court .................. 92/12.2 |
| 3,637,036 | A | | 1/1972 | Swisher, Jr. et al. |
| 3,677,362 | A | | 7/1972 | Chatterjea |
| 3,812,765 | A | * | 5/1974 | Himmler .................. 91/387 |
| 3,945,764 | A | | 3/1976 | Marietta |
| 4,051,416 | A | | 9/1977 | Golobay |
| RE31,711 | E | | 10/1984 | Horiuchi |
| 4,741,251 | A | * | 5/1988 | Hayashi et al. .................. 417/269 |
| 4,875,390 | A | * | 10/1989 | Hayashi et al. .................. 60/445 |
| 4,977,760 | A | * | 12/1990 | Ishimori et al. .................. 60/444 |
| 5,201,637 | A | * | 4/1993 | Folland et al. .................. 417/218 |
| 5,697,764 | A | | 12/1997 | Oda et al. |
| 6,095,760 | A | | 8/2000 | Houtman |
| 6,119,456 | A | * | 9/2000 | Louis et al. .................. 60/444 |
| 6,283,721 | B1 | | 9/2001 | Gollner |
| 6,443,706 | B1 | | 9/2002 | Deininger et al. |

(Continued)

*Primary Examiner*—Igor Kershteyn
(74) *Attorney, Agent, or Firm*—Daniel J. Whitman; Joseph J. Pophal (57) ABSTRACT

Improvements in trunnion shaft-controlled swashplate axial hydraulic piston pumps as well as hydraulic systems used in hydrostatic transmissions utilized. e.g., in zero-turn-radius (ZTR) wheeled vehicles, such as grass mowers, with one embodiment thereof pertaining to, in combination, the noted pump, devoid of any internal servo control, and a reversible power actuator, for controlling the angle of the swashplate, externally affixed to the housing containing the pump and operatively interconnected with an end of the trunnion shaft extending from the pump housing, with the power actuator being one of a rotary actuator, a fluid power axial cylinder and a rotary electronic actuator. Usage in a ZTR wheeled vehicle requires the prime mover to independently drive two hydraulic transmissions that are controlled by a human operator via a mechanical lever, either two single-axis or one dual-axis joystick control, or a steer-by-wire unit, connected with right and left power actuators

13 Claims, 7 Drawing Sheets

U.S. PATENT DOCUMENTS

| | | | |
|---|---|---|---|
| 6,553,891 B2 * | 4/2003 | Fiebing et al. | 92/12.2 |
| 6,581,710 B2 | 6/2003 | Sprinkle et al. | |
| 6,848,254 B2 | 2/2005 | Du | |
| 6,955,046 B1 * | 10/2005 | Holder et al. | 60/487 |
| 2002/0070071 A1 | 6/2002 | Schuh | |
| 2003/0070859 A1 | 4/2003 | Dahl et al. | |
| 2004/0177610 A1 | 9/2004 | Hendrickson | |

* cited by examiner

CONTROL DEVICES FOR SWASHPLATE TYPE VARIABLE DISPLACEMENT PISTON PUMP

CROSS REFERENCE TO RELATED APPLICATIONS

The present application claims the benefit of the filing date of U.S. Provisional Application Ser. No. 60/650,871, filed Feb. 8, 2005, the disclosure of which is incorporated herein by reference.

FIELD OF THE INVENTION

The present invention pertains to trunnion shaft-controlled swashplate axial piston pumps as well as hydraulic systems used in hydrostatic transmissions utilized, e.g., in zero-turn-radius wheeled vehicles, wherein the noted pump, devoid of any internal servo control, is operatively interconnected with a reversible power actuator for controlling the angle of the swashplate with the actuator being externally affixed to the pump housing and operatively interconnected with an end of the trunnion shaft that extends from the pump housing. Control devices, used by a human operator, include a mechanical lever, either two single or one dual-axis joystick control, as well as a steer-by-wire unit, each of which is interconnected with at least one power actuator

BACKGROUND OF THE INVENTION

Figure 1:
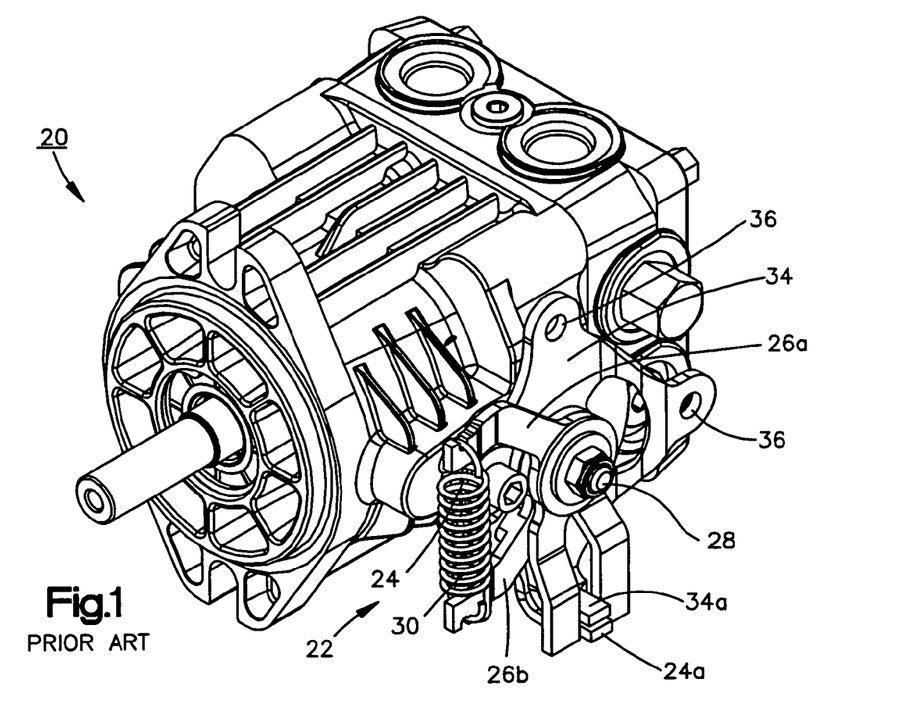
FIG. 1 is a perspective view of a prior art light duty axial swashplate piston pump, with a trunnion shaft and a return-to-neutral device, for controlling the swashplate pivot angle.

Axial swashplate type piston pumps, such as the one illustrated in prior art FIG. 1, are the main components in most hydrostatic transmissions. Such pumps generate a pump action by causing each piston to reciprocate within its piston bore with reciprocation of the piston being caused by a swashplate that the pistons impinge upon as a cylinder block rotates. Pump displacement, of course, depends on the bore size and the piston stroke as well as the number of pistons that are utilized. The swashplate pivot angle determines the length of the piston stroke, which can be varied by changing the noted swashplate angle, as is well known in the art. For a variable displacement pump, the swashplate can be integrated on a pivoted yoke, as illustrated in prior art FIGS. 2 to 4, near the center of the pump, or mounted onto cradle surfaces of either the front housing, as illustrated in prior art FIG. 5, or at the end cap, again as is well known in the art.

With the swashplate rotating at its extreme pivot angle, a maximum fluid volume is discharged from the pump outlet. However, when the swashplate is centered with the cylinder barrel, the pump will not generate any fluid flow. In some axial swashplate type piston pump designs, the swashplates have the capability of crossing over-center which results in the increasing and decreasing of the fluid flow volumes being generated at opposite ports. In an over-center axial swashplate piston pump, each system port can be either an inlet or an outlet port depending on the pivot angle of the swashplate. Over-center axial swashplate piston pumps are very widely used in hydrostatic transmissions and are generally referred to as closed-loop pumps.

Different control options are available for most variable displacement axial piston pumps for dynamically controlling the pivot angle of the swashplate according to the special requirements of the specific application. For example, constant pressure control, constant horsepower control, and electrical flow control are typical popular options that are used to control the dynamic response of the swashplate of such a pump. These noted control options are typically integrated into a control device that is attached to the pump housing. This control device is generally known as a compensator and controls the angular position of the pump swashplate via a servo-piston, examples of which are illustrated in prior art FIGS. 2 to 5. Such compensators are very widely used in most medium and heavy-duty axial piston pumps. Light duty axial piston pumps, which typically use spherically-nosed pistons instead of using pistons with slippers for low cost production, normally have no other control options beyond direct mechanical control. In other words, an external lever is coupled to the trunnion shaft of the axial piston pump for changing the pump fluid flow rate and direction during the operation thereof. The trunnion shaft is linked to the swashplate, in a manner well known in the art, with the rotation or pivoting thereof causing an angular change of the swashplate. The axial piston pump illustrated in prior art FIG. 1 includes a return-to-neutral device wherein a large plate having two spaced holes is connected to the pump trunnion shaft. In order to stroke this pump, a separate linkage (not shown) is attached to one of the noted holes.

The patent literature includes a large number of references pertaining to axial swashplate type variable displacement piston pumps that include control devices therefor. Examples thereof, which will be briefly discussed hereinafter, include: U.S. Pat. No. 3,677,362 to Chatterjea; U.S. Pat. No. RE 31711 to Horiuchi; and U.S. Pat. No. 6,443,706 B1 to Deininger et al.

Turning first to U.S. Pat. No. 3,677,362 to Chatterjea, the structure thereof pertains to a directional valve with a two-axis mechanical handle/joystick for controlling a hydrostatic transmission but no details are provided about how to attach the actuator to the pump swashplate. One embodiment of the control devices of the present invention utilizes a directional flow control valve with a single-axis handle, while other embodiments utilize electronic joystick control for two-axis applications.

U.S. Pat. No. RE 31711 to Horiuchi sets forth a conventional structure to control the angle of the swashplate by using an axial servo spool/piston at the uppermost location of the swashplate. In the control devices of the present invention, an external actuator is utilized in an operative interconnection with the trunnion shaft at that location.

U.S. Pat. No. 6,443,706 B1 is similar to above-noted U.S. Pat. No. RE 31711 to Horiuchi and uses a servo-spool/piston at both the uppermost and lowest ends of the swashplate in order to control the swashplate angle, rather than at the trunnion shaft location as is the case with the control devices of the present invention. In addition, a rotary valve is used as a directional flow control valve to supply fluid flow into and out of the servo spools. In contrast thereto, the control devices of the present invention utilize a rotary actuator, not a rotary directional flow control valve, to rotate the swashplate via the trunnion shaft, and not via a servo spool.

In all of the prior art structures, the actuators and/or cylinders for pivoting the pump swashplates are physically located inside the pumps themselves and are controlled by compensators. Thus, there is direct control of the swashplate within the pump itself which is expensive and complex. In addition, servicing and maintenance require that the pump unit be opened up and at least partially disassembled.

It should be understood that for most variable displacement pumps, an optional, complicated, servo control system is the preferred control system for differing hydraulic systems. Such control systems include the previously-noted constant pressure control, constant horsepower control and electronic control. Such a servo system usually provides for an interaction between the work condition, i.e., the work being performed, and the pump swashplate. For that reason, the necessary servo valve is generally placed inside the hydraulic pump itself, or attached to the pump at a location remote from the swashplate trunnion shaft since the servo valve requires its flow passages to be connected to the pump end cover.

For zero-turn-radius (ZTR) machines or vehicles, no servo valve is required since the human operator can sense the working conditions and physically make the necessary changes based upon his/her decision. Thus, the simplest and most logical way to add automatic swashplate control is via a trunnion shaft location thereof in the manner set forth in the present invention.

BRIEF SUMMARY OF THE INVENTION

Accordingly in order to overcome the deficiencies of the prior art devices, the present invention provides an improvement: in trunnion shaft-controlled swashplate axial hydraulic pumps; in hydraulic systems for use with hydrostatic transmissions; in hydraulic systems for wheeled vehicles having independently driven right and left wheels; in hydraulic systems for zero-turn-radius wheeled vehicles; in zero-turn-radius wheeled vehicles; and in hydraulic systems for zero-turn radius vehicles.

Specifically, one embodiment of this invention pertains, in combination, to a trunnion shaft-controlled swashplate type axial piston hydraulic pump, devoid of any internal servo control, and a reversible power actuator, for controlling the angle of the swashplate, externally affixed to a housing containing the piston pump and having an operative interconnection with the swashplate at the pivot center axis thereof.

In a basic version thereof, the operative interconnection includes an end of the trunnion shaft extending from the pump housing.

In one version thereof, the reversible power actuator takes the form of a fluid power rotary actuator, with the rotary actuator preferably being a hydraulic vane type actuator.

In another version thereof, the reversible power actuator takes the form of a fluid power axial cylinder, with the fluid power axial cylinder preferably being a hydraulic cylinder.

In a differing version thereof, the reversible power actuator takes the form of a rotary electronic actuator, with the rotary electronic actuator preferably being a stepper or servo motor.

Another embodiment of this invention pertains to, in combination, a trunnion shaft-controlled swashplate type axial piston hydraulic pump; a reversible power actuator, for controlling the angle of the swashplate, externally affixed to a housing containing the piston pump and having an operative interconnection with the swashplate pivot center axis; and an integral auxiliary pump, for supplying fluid flow to the reversible power actuator.

In a basic version thereof, the operative interconnection includes an end of the trunnion shaft extending from the pump housing.

In one version thereof, the piston pump further includes an integral directional control valve for controlling the reversible power actuator.

In a further version thereof, the piston pump further includes an integral servo-type directional control valve for controlling the reversible power actuator.

A further embodiment of this invention pertains to a hydraulic system for use with a hydrostatic transmission, comprising in combination: a. a driven variable displacement trunnion shaft-controlled swashplate type axial piston main hydraulic pump; b. a hydraulic motor; c. a closed-loop hydraulic control circuit, operatively interconnecting the main pump and motor; d. a driven charge pump, within the control circuit; e. a reversible power actuator, for controlling the angle of the swashplate, externally affixed to a housing containing the main pump and operatively interconnected with an end of the trunnion shaft extending from the main pump housing; and f. a hydraulic directional control valve, within the hydraulic control circuit, for controlling the reversible power actuator, the directional control valve being actuatable, by a human operator, via a mechanical lever.

In one version thereof, the hydraulic directional control valve takes the form of a four-way three-position directional control valve.

A differing version thereof further includes a driven integral auxiliary pump for supplying fluid flow to the reversible power actuator.

A differing embodiment of this invention pertains to a hydraulic system for use with a hydrostatic transmission, comprising in combination: a. a driven variable displacement trunnion shaft-controlled swashplate type axial piston main hydraulic pump; b. a hydraulic motor; c. a closed-loop hydraulic circuit, operatively interconnecting the main pump and motor; d. a driven charge pump, within the control circuit; e. a reversible power actuator, for controlling the angle of the swashplate, externally affixed to a housing containing the main pump and operatively interconnected with an end of the trunnion shaft extending from within the main pump housing; and f. one of a proportional directional control valve and a servo type directional control valve, within the hydraulic control circuit, for controlling the reversible power actuator, the control valve being actuatable, by a human operator, via a single-axis joystick control device and a control box.

One version thereof further includes a driven integral auxiliary pump for supplying fluid flow to the reversible power actuator.

Still a further embodiment of this invention pertains to a hydraulic system for use with a hydrostatic transmission, comprising in combination: a. a driven variable displacement trunnion shaft-controlled swashplate type axial piston main hydraulic pump; b. a hydraulic motor; c. a closed-loop hydraulic control circuit, operatively interconnecting the main pump and motor; d. a driven charge pump, within the control circuit; e. a reversible rotary electronic actuator, for controlling the angle of the swashplate, externally affixed to a housing containing the main pump and operatively interconnected with an end of the trunnion shaft extending from the main pump housing; and f. the reversible rotary electronic actuator being controllable, by a human operator, via a single axis joystick and an electronic control device.

In one variation thereof, the reversible rotary electronic actuator takes the form of a stepper or servo motor.

Yet another embodiment of this invention pertains to a hydraulic system for use in a vehicle having a single prime mover for simultaneously and independently driving separate Right and Left hydrostatic transmissions for independently powering Right and Left wheels, respectively, of the vehicle, the hydraulic system comprising in combination: a. a Right and Left variable displacement trunnion shaft-controlled swashplate type axial piston main hydraulic pump; b. a Right and Left hydraulic motor; c. a Right and Left closed-loop hydraulic control circuit, operatively interconnecting its associated main pump and motor; d. a Right and Left driven charge pump within its respective control circuit; e. a Right and Left reversible power actuator, for controlling the angle of its respective swashplate, each externally affixed to a respective housing containing the Right and Left main pumps and operatively interconnected with an end of a respective trunnion shaft extending from each associated main housing pump; f. Right and Left ones of a proportional directional control valve and a servo type directional control valve, within the hydraulic control circuit, for controlling its respective reversible power actuator; and g. a single two-axis joystick and a control device, operatively interconnected with the Right and Left directional control valves, the two-axis joystick control device being actuatable, by a human operator, for directional and velocity control of the vehicle.

A variation thereof further includes a Right and Left driven integral auxiliary pump for supplying fluid flow to its associated reversible power actuator.

A still further embodiment of this invention pertains to a hydraulic system for use in a wheeled vehicle having a single prime mover for simultaneously and independently driving separate Right and Left hydrostatic transmissions for independently powering Right and Left wheels, respectively, of the vehicle, the hydraulic system comprising in combination: a. a Right and Left variable displacement trunnion shaft-controlled swashplate type axial piston main hydraulic pump; b. a Right and Left hydraulic motor; c. a Right and Left closed-loop hydraulic control circuit, operatively inter connecting its associated main pump and motor; d. a Right and Left driven charge pump within its respective control circuit; e. a Right and Left reversible rotary electronic actuator, for controlling the angle of its respective swashplate, each externally affixed to a respective housing containing the Right and Left main pump and operatively interconnected with an end of a respective trunnion shaft extending from each associated main pump housing; and f. a single two-axis joystick and an electronic control device, operatively interconnected with the Right and Left reversible rotary electronic actuators, the two-axis control device being actuatable, by a human operator, for directional and velocity control of the vehicle.

In one version thereof, each of the Right and Left reversible rotary electronic actuators takes the form of a stepper or servo motor.

A further embodiment of this invention pertains to a hydraulic system for use in a zero-turn-radius wheeled vehicle having a single prime mover for simultaneously and independently driving separate Right and Left hydrostatic transmissions for independently powering Right and Left wheels, respectively, of the zero-turn-radius vehicle, the hydraulic system comprising in combination: a. a Right and Left variable displacement trunnion shaft-controlled swashplate type axial piston main hydraulic pump; b. a Right and Left hydraulic motor; c. a Right and Left closed-loop hydraulic control circuit, operatively interconnecting its associated main pump and motor; d. a Right and Left driven charge pump within its respective control circuit; e. a Right and Left reversible rotary electronic actuator, for controlling the angle of its respective swashplate, each externally affixed to a respective housing containing the Right and Left main pump and operatively interconnected with an end of a respective trunnion shaft extending from each associated main pump housing; and f. a steer-by-wire unit, operatively interconnected with the Right and Left reversible rotary electronic actuators, the steer-by-wire unit being actuatable by a human operator, for directional control of the vehicle.

In one version thereof, the zero-turn-vehicle takes the form of a lawn mower, with the lawn mower including at least one cutting blade.

A yet further embodiment of the present invention pertains to a zero-turn-radius wheeled vehicle having a single prime mover for simultaneously and independently driving separate Right and Left hydrostatic transmissions for independently powering Right and Left wheels thereof, respectively, the zero-turn-radius wheeled vehicle having a hydraulic system comprising: a. a Right and Left variable displacement trunnion shaft-controlled swashplate type axial piston main pump; b. a Right and Left hydraulic motor; c. a Right and Left closed-loop hydraulic control circuit, operatively interconnecting its associated pump and motor; d. a Right and Left driven charge pump within its respective control circuit; e. a Right and Left reversible rotary electronic actuator, for controlling the angle of its respective swashplate, each externally affixed to a respective housing containing the Right and Left main pump and operatively interconnected with an end of a respective trunnion shaft extending from each associated main pump housing; and f. a steer-by-wire unit operatively interconnected with the Right and Left reversible electronic actuators, the steer-by-wire unit being actuatable by a human operator, for directional control of the vehicle.

In one version thereof, the vehicle takes the form of a lawn mower, with the lawn mower preferably including at least one cutting blade.

In a still a further embodiment, in a zero-turn-radius wheeled vehicle, having a single prime mover for simultaneously and independently driving separate Right and Left hydrostatic transmissions for independently powering Right and Left wheels thereof, respectively, an improved hydraulic system comprises in combination: a. a right and Left variable displacement trunnion shaft-controlled swashplate type axial piston main pump; b. a Right and Left hydraulic motor; c. a Right and Left closed-loop hydraulic control circuit, operatively interconnecting its associated pump and motor; d. a Right and Left driven charge pump within its respective circuit; e. a Right and Left reversible rotary electronic actuator, for controlling the angle of its respective swashplate, each externally affixed to a respective housing containing the Right and Left main pump and operatively interconnected with an end of a respective trunnion shaft extending from each associated main pump housing; and f. a steer-by-wire-unit operatively interconnected with the Right and Left reversible electronic actuators, the steer-by-wire unit being actuatable by a human operator, for directional control of the vehicle.

In one version thereof, the vehicle takes the form of a lawn mower, with the lawn mower including at least one cutting blade.

The previously-described advantages and features, as well as other advantages and features, will become readily apparent from the detailed description of the preferred embodiments that follow.

DETAILED DESCRIPTION OF THE INVENTION

Referring now to the drawings, illustrated via a perspective view in FIG. 1 is a commercial prior art light duty axial swashplate piston pump 20, available from the Parker Hannifin Corporation of Cleveland Ohio, U.S.A. as model H1A. Pump 20 is equipped with a bidirectional return-to-neutral device 22 that includes a stationary lever 24 having a tab 24a and a pair pivotable levers 26a, 26b that are affixed to an outer end of a trunnion shaft 28, which in turn is affixed to an internal swashplate (not shown here) in a manner well known in the art. A tensioning member, such as a spring 30, interposed between levers 26a, 26b, serves to normally bias the swashplate to a neutral position. A throttle plate 34, having a tab 34a and also being affixed to trunnion shaft 28, is operatively interconnected with a linkage (not shown) via one of two throttle plate apertures 36. In order to stroke pump 20, the linkage is actuated by a human operator, thereby causing the pivoting of the swashplate in a known manner.

Figure 2:
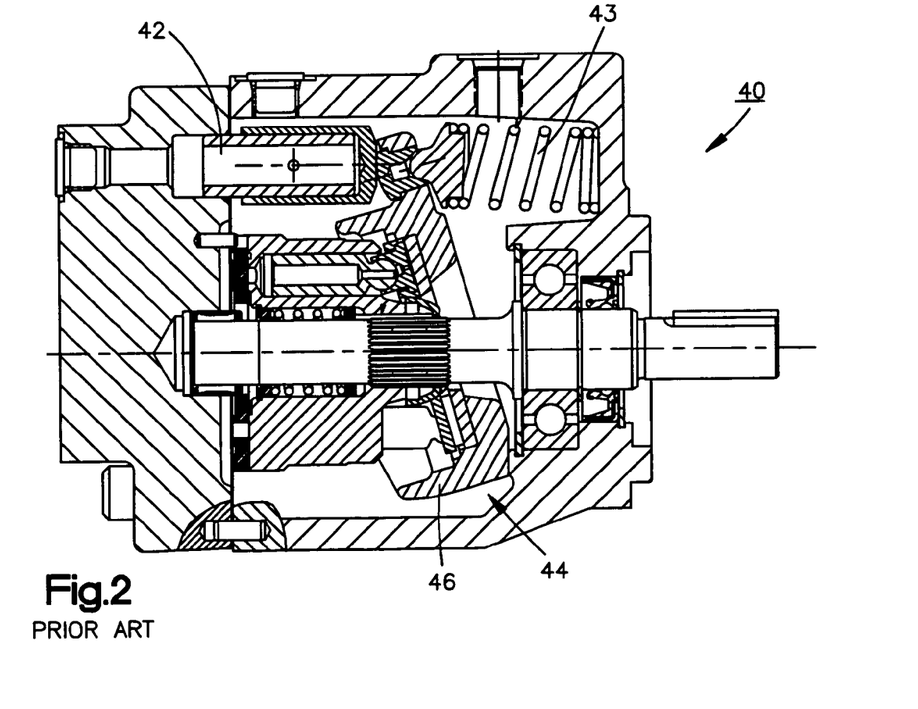
FIG. 2 is a longitudinal cross-sectional view of a prior art swashplate piston pump, wherein a servo-piston and a spring are used to control the yoke (swashplate supported by two pivots not shown in the drawing) pivot angle for this open loop pump.

FIG. 2 is a longitudinal cross-sectional view of a prior art swashplate piston pump 40 wherein a servo-piston 42 and spring 43 are used to control the pivot angle of a yoke 44, comprised of a swashplate 46 supported by two pivots (not shown), in this open loop pump 40. Servo-piston 42 and spring 43 are of an in-line design. A commercial example of pump 40 is the PVP16 pump that is also available from the Parker Hannifin Corporation.

Figure 3:
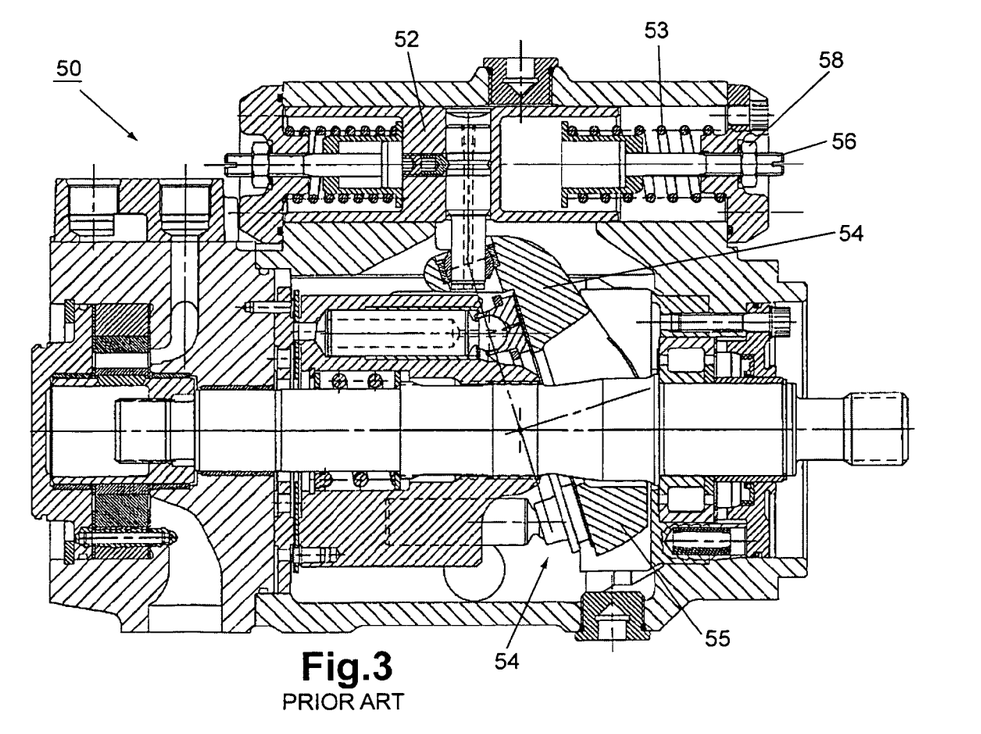
FIG. 3 is a longitudinal cross-sectional view of a prior art swashplate piston pump, wherein a servo-piston and a spring are used to control the yoke (swashplate supported by two pivots not shown in the drawing) pivot angle for this open loop pump.

FIG. 3 is a longitudinal cross-sectional view of a prior art swashplate piston pump 50, such as the VPC pump available from the Parker Hannifin Corporation, wherein a servo-piston 52 and a spring 53 are used to control the pivot angle of a yoke 54, comprised of a swashplate 55, wherein swashplate 55 is supported by two pivots (not shown), in this open loop pump 50. Servo-piston 52 and spring 53 are of an in-line design, with the spring preload being adjustable via a screw 56 and a lock nut 58.

Figure 4:
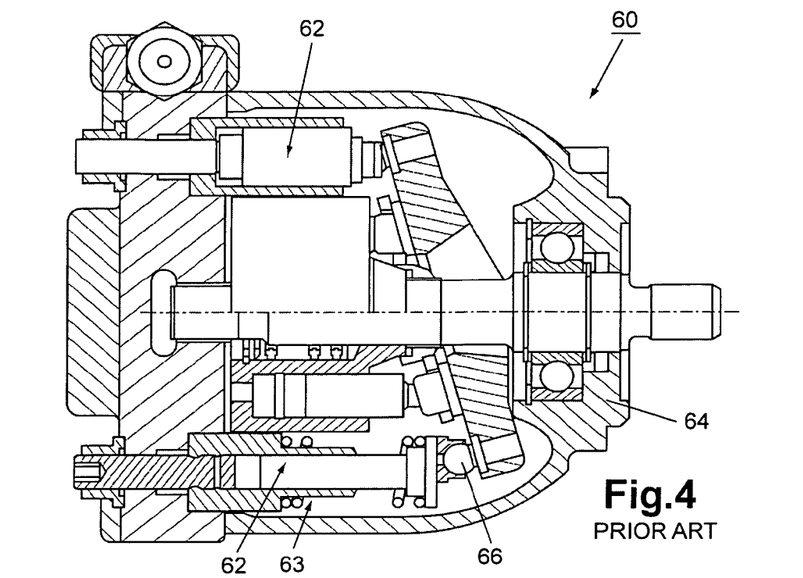
FIG. 4 is a longitudinal cross-sectional view of another prior art swashplate piston pump, wherein a servo-piston and a spring are used to control the yoke (swashplate supported by two pivots not shown in the drawing) pivot angle for this open loop pump.

FIG. 4 is a longitudinal cross-sectional view of another prior art swashplate piston pump 60, such as the VPO pump available from the Parker Hannifin Corporation, wherein a servo-piston 62 and a spring 63 are used to control the pivot angle of a yoke 64, comprised of a swashplate 66 supported by two pivots (not shown), in this known, open loop pump. Servo-piston 62 and spring 63 are not of an in-line design and are located at opposite sides of the piston barrel. Again, as in pump 50 of FIG. 3, the spring preload is adjustable via a screw and a lock nut. The servo spool includes an adjustable mechanical stop when the pump is destroked by spring 63.

Figure 5:
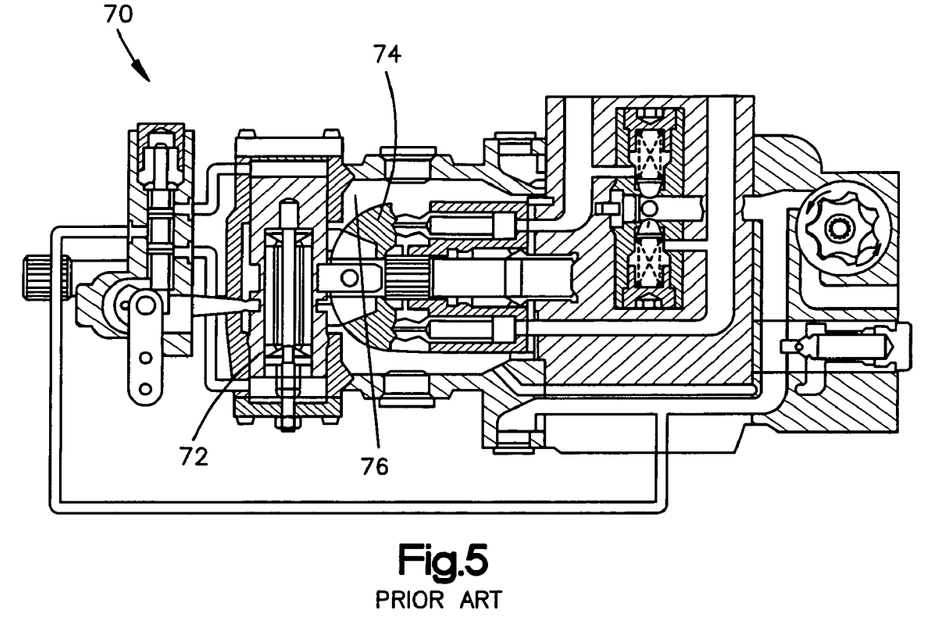
FIG. 5 is a longitudinal cross-sectional view of a prior art swashplate piston pump, wherein a servo-piston is used to control the swashplate (swashplate supported by two cradle bearings) pivot angle for a closed-loop (overcenter) pump.

FIG. 5 is a longitudinal cross-sectional view of a prior art swashplate piston pump 70, wherein a servo-piston 72 is used to control the pivot angle of a swashplate 74, supported by two cradle bearings 76, in this known, closed loop (over-center) pump. Such pumps are available from the Eaton Corporation in Cleveland, Ohio, U.S.A.

Figure 6:
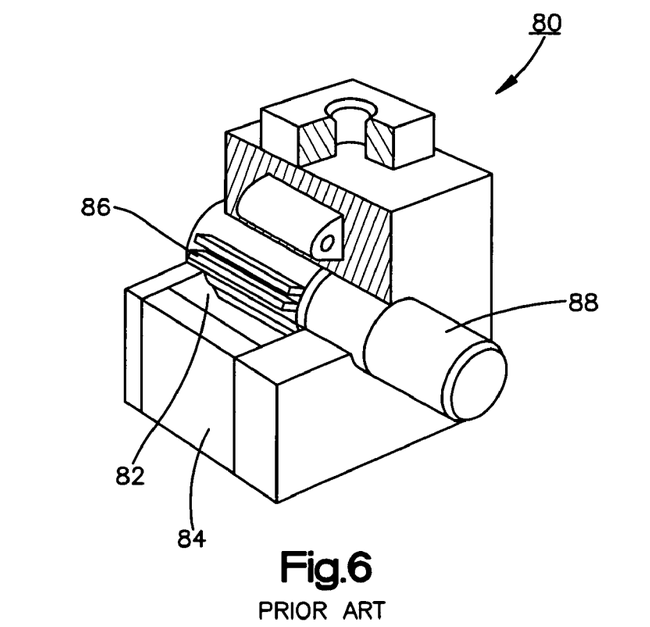
FIG. 6 is a perspective view, with parts broken away, of a prior art fluid pressure rotary actuator, used, for example, for rotating the trunnion shaft of a swashplate piston pump.

FIG. 6 is a perspective view, with parts broken away, of a prior art fluid rotary actuator 80 that can be used, for example, to rotate the trunnion shaft of an axial swashplate piston pump. Rotary actuator 80 may take the form of vane type actuator wherein a short cylindrical chamber 82 in a body 84 encloses a vane 86 attached to a central shaft 88. Fluid pressure is applied through a stationary barrier or stator (not shown), within body 84, to one side of vane 86. The opposite side of vane 86 is connected to exhaust through the stator. The applied pressure overcomes seal friction and produces rotation of vane 86 and central shaft 88 in a manner well known in the art. If so desired, rotary actuator 80 can be integrated into or added to one of the previously discussed prior art axial swashplate piston pumps and the trunnion shaft thereof and output shaft 88 of actuator 80 can be combined into a single part. Rotary actuators of this type are also available from the Parker Hannifin Corporation and are set forth, in detail, in Parker catalogue AU 03-0900-2/NA.

Figure 7:
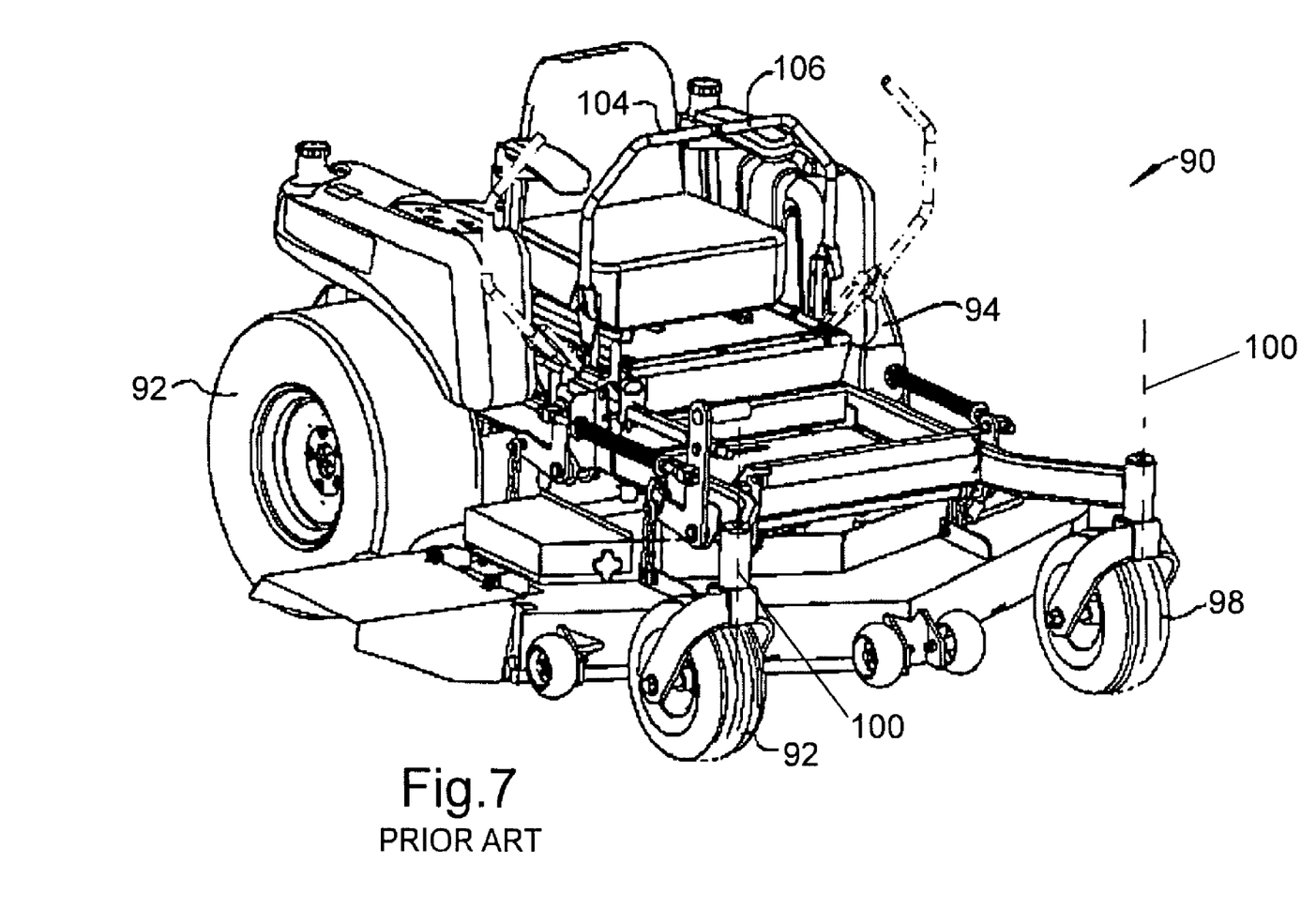
FIG. 7 is a perspective view of a typical, known, zero-turn-radius (ZTR) vehicle, such as a mowing machine, where an operator uses two pivoting control levers for the operation thereof.
Figure 8:
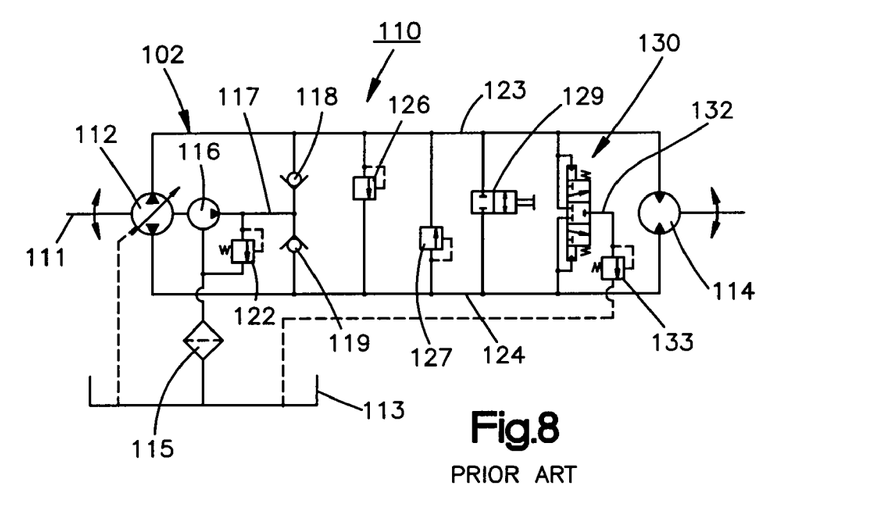
FIG. 8 is a typical prior art hydraulic circuit diagram of a drive system, for one side, of a ZTR vehicle, such as the mowing machine depicted in FIG. 7.

FIG. 7 is a perspective view of a typical, zero-turn-radius (ZTR) wheeled vehicle 90, such as a grass mowing machine having at least one grass cutting blade (not shown). Vehicle 90 utilizes a single engine that drives a separate, independent transmission for each of its right and left side rear driving wheels 92, 94, respectively. The independent front right and left wheels 96, 98, respectively, are caster-type wheels that are free to pivot about their vertical clevis axes 100, in a manner well known in the art. Current efforts continue in the development of innovative hydrostatic drive systems for many applications including but not limited to mowing machines for both commercial and residential uses. Today, most commercial ZTR machines are driven by separate, dual, hydrostatic transmissions for the right and left driven wheels 92, 94, as noted. Each of the separate transmissions includes its own closed-loop wheel drive circuit 110, as shown in FIG. 8. Both transmissions function independently and are operated via their own human operator-actuated right and left hand control levers 104, 106, respectively, as illustrated in FIG. 7. Each of control levers 104, 106 is linked to a respective trunnion shaft of an associated pump and enables the operator to control the direction and amount of fluid flow from each transmission pump. When the operator pushes lever 104 or 106 in one direction, the associated pump delivers fluid flow for one direction of corresponding motor operation. When the operator pulls lever 104 or 106 in the opposite direction, the associated pump delivers fluid flow for the opposite direction of corresponding motor operation. The use of these dual hydrostatic transmissions permits the zero-turnradius feature of these vehicles, which is an important feature, particularly in commercial mowers, with ZTR mowers being a popular choice for use on large commercial properties. However, the existing dual-lever mechanical control scheme suffers from several disadvantages which includes that the operator has to hold and frequently swing both of levers 104 and/or 106 with significant input control force during operation of the vehicle. This can result in fatigue issues for the operators.

Figure 9:
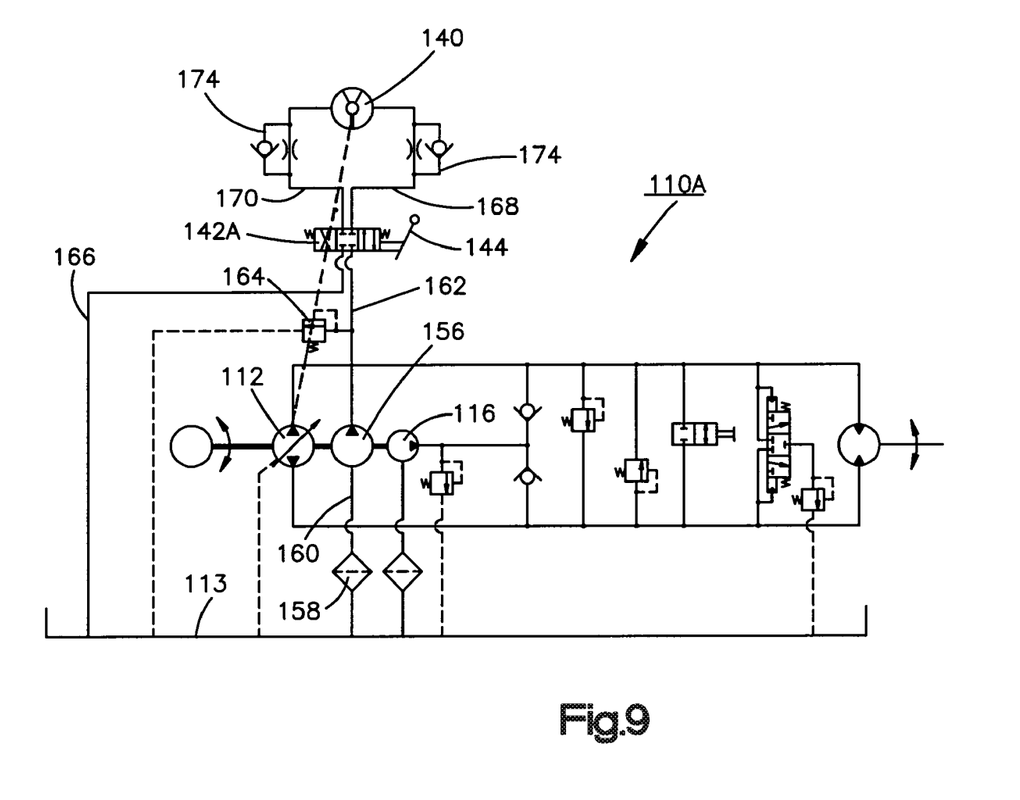
FIG. 9 is one embodiment of the control circuits of the present invention which utilizes direct hydro-mechanical joystick control, including a three-position four-way directional control valve, for controlling one side of a vehicle drive system.

FIG. 8, which shows a schematic diagram of a typical prior art closed-loop circuit or loop 110 for a hydrostatic transmission 102, is similar to that of FIG. 9 of U.S. Pat. No. 6,837,047 B2 to Dong et al. also assigned to the assignee of the present invention, consisting of a variable displacement main radial piston pump 112 and a hydraulic motor 114, such as a fixed displacement motor, connected to each other by lines 123 and 124 of a closed loop fluid circuit 110. In pump 112, such as an over-center variable displacement axial piston pump, the displacement thereof is determined by the size and number of pistons, as well as stroke length. An input shaft 111 for pump 112 is driven by a prime mover (not shown), such as an internal combustion engine, at a predetermined speed in a predetermined rotational direction. As already noted, the stroke length is determined by the pivot angle of the swashplate of pump 112, which can be tilted by any corresponding stroke controlling device, for example a trunnion shaft (not shown in FIG. 8). The trunnion shaft is connected to one of control handles or levers 104, 106 via an appropriate linkage. When an operator pushes one of levers 104, 106 forward, pump 112 delivers fluid flow for one direction of motor 114 operation. Changing the displacement of pump 112 will change its output flow rate, which in turn controls the speed of motor 114. Moving the swashplate or yoke (not shown) of pump 112 overcenter will automatically reverse the fluid flow out of pump 112, thus reversing the rotational direction of motor 114. Depending upon the direction of the overcenter movement of the pump swashplate or yoke, line 123 (or line 124) of circuit or loop 110 can be a high pressure supply line or a low pressure return line.

A charge pump 116, also driven via input shaft 111, supplies additional hydraulic fluid to closed-loop circuit 110, generally at the rate of 10-30% of the flow rate that main pump 112 can deliver. Charge pump 116 draws fluid from a reservoir 113 which can be passed through a filter 115 and supplies this filtered fluid into closed-loop circuit 110 through a conduit line 117 by way of one-way check valves 118 and 119 to compensate for any possible loss due to internal leakage. A charge pump relief valve 122 is used to provide a relief path to reservoir 113 when more than the required fluid flow from charge pump 116 cannot enter closed-loop circuit 110, and also regulates the pressure of the low pressure side of circuit 110. Relief valves 126 and 127 are positioned between lines 123 and 124 so as to protect each line from pressure overload during operation. Valve 126 provides relief for line 123 and valve 127 provides relief for line 124.

In certain applications, closed-loop circuit 110 will also have a bypass valve 129 positioned between lines 123 and 124 in order to transfer fluid from one line to the other. The use of bypass valve 129 will enable motor 114 to turn over with little resistance when it is desirable, for example, to move a vehicle for a short distance without operating the transmission. Again, in certain applications, a hot oil shuttle valve 130 is provided to reduce loop temperature by connecting the low pressure side of closed-loop circuit 110 to a drain line. This valve allows a certain percentage of the hot fluid being discharged from motor 114 to flow back to reservoir 113 for cooling and filtering, and replaces the discharged hot fluid with cooled, filtered fluid from charge pump 116. Line 132 connects a forward/reverse charge pressure relief valve 133 with hot oil shuttle valve 130 to provide a lower resistance on the low pressure side of closed-loop circuit 110. Relief valve 133 maintains a certain amount of fluid pressure on the low pressure side of close-loop circuit 110. Since charge pump relief valve 122 is in parallel with relief valve 133, charge pump relief valve 122 should be set at a pressure higher than that of relief valve 133. When the transmission is in neutral and hot oil shuttle valve 133 is centered, charge pump flow is relieved over relief valve 122.

The new control methods of the present invention, which minimize the noted fatigue issues for operators, use joystick and/or steer-by-wire steering wheel controls designed for enhanced ergonomics and ease-of-use. Preferably one of a two-axis joystick and a steering wheel, or two single-axis joy sticks are used for vehicle, such as a ZTR mower application, for example. If joysticks are utilized, they are conveniently located, on the vehicle, near the operator, so as to maximize operator comfort and efficiency. An actuator (rotary or axial cylinder) is operatively interconnected with the swashplate at the swashplate pivot center axis by being directly affixed to the outer end of the trunnion shaft of each pump on the outside of the pump. The rotary actuator can take the form of either a reversible hydraulic rotary actuator, such as for example the vane type rotary actuator shown in FIG. 6, or an electronic motor, such as a known stepper or stepping motor or a servo motor of any desired type.

Figure 10:
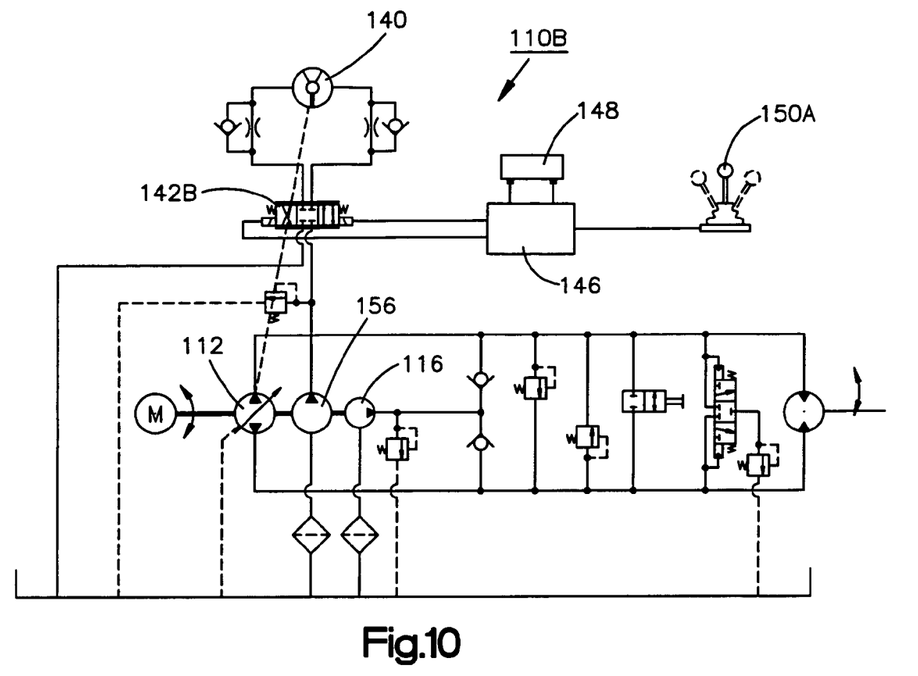
FIG. 10 is a differing embodiment of the control circuits of the present invention which utilizes direct electronic single axis joystick control, including a control box and a proportional directional control valve, for controlling one side of a vehicle drive system.
Figure 11:
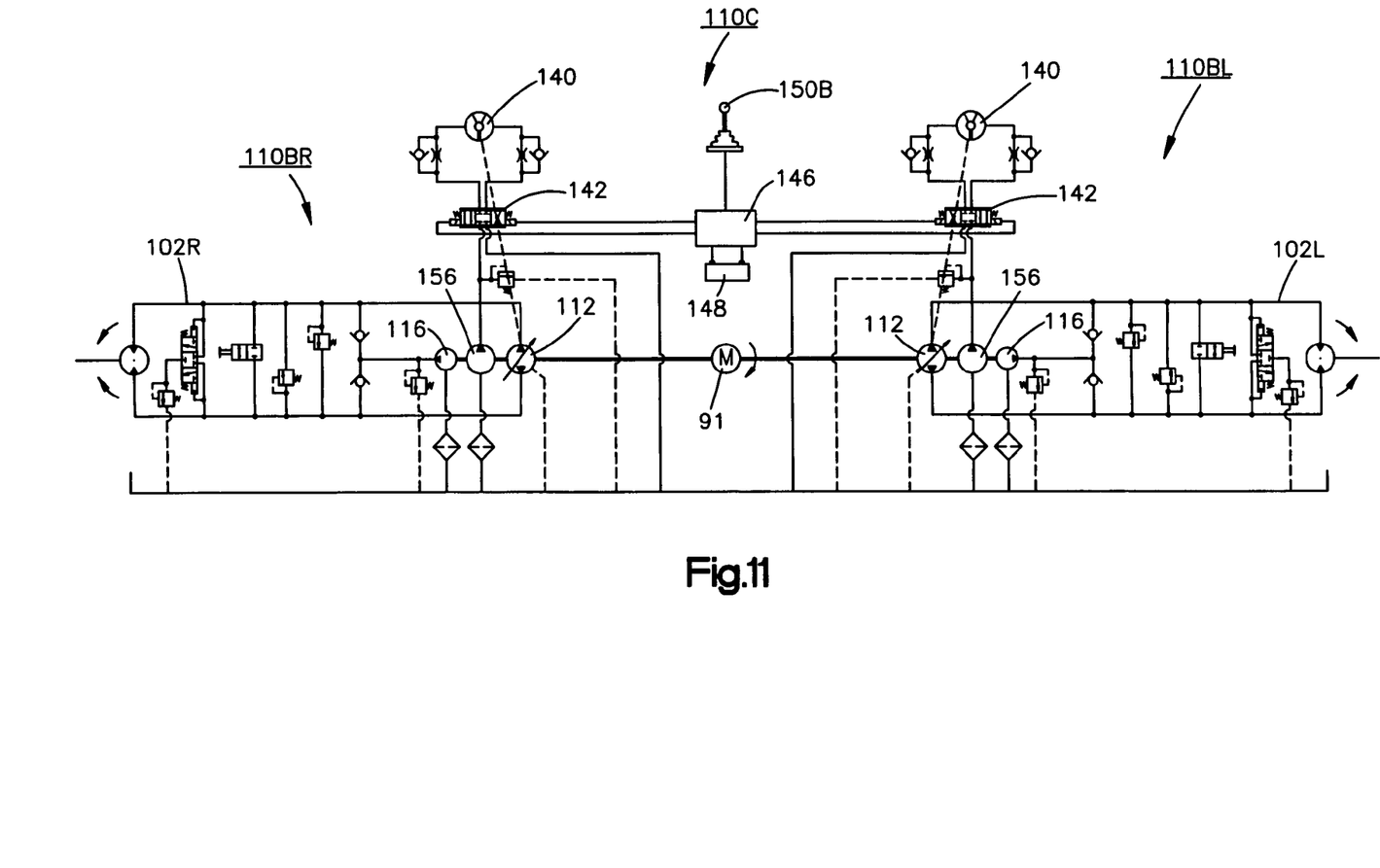
FIG. 11 is another embodiment of the control circuits of the present invention which uses direct electro-hydraulic two axis joystick control and a control box, as well as a proportional directional control valve and a rotary actuator for each of the two sides of a vehicle drive system.
Figure 12:
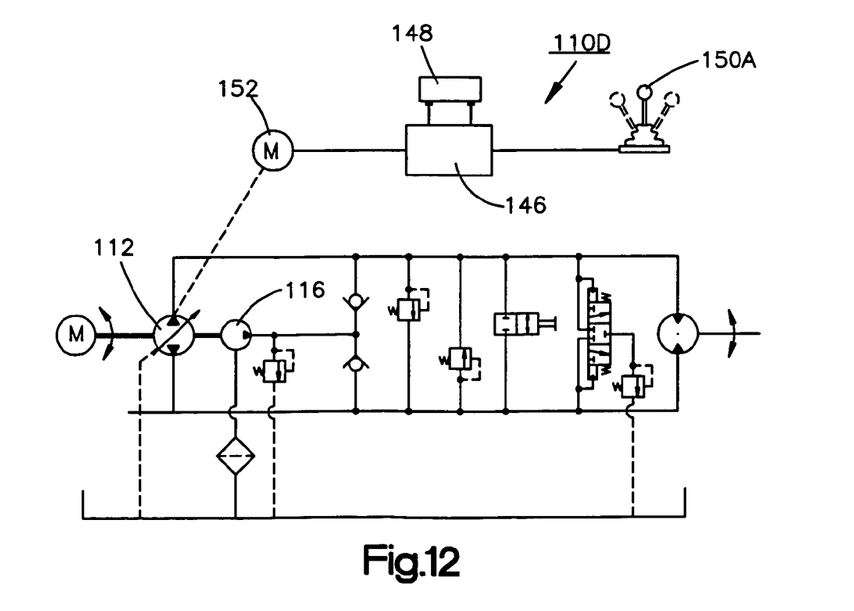
FIG. 12 is another embodiment of the control circuits of the present invention which uses direct electronic joystick control, a control box and a stepper-servo a stepper motor, for one side of a vehicle drive system.

In order to permit a hydraulic rotary actuator or cylinder, such as rotary actuator 140, used in the control circuits illustrated in FIGS. 9, 10 and 11, to control the swashplate of hydrostatic pump 112 via a swashplate trunnion shaft (not shown per se), a hydraulic flow directional control valve, such as flow directional control valve 142, used in FIGS. 9, 10 and 11, is also required. Valve 142 can be controlled mechanically, such as via a control lever 144 shown in FIG. 9; hydraulically, such as via pilot control by another control device at a remote location (not shown per se); or electronically via an electrical proportional directional control valve controlled by a variable electronic current, such as via an electronic control box 146 together with an associated battery 148 and a joystick 150, as shown in FIGS. 10 and 11. In order to permit the use of a stepper/stepping or servo motor 152 to control the swashplate angle of hydrostatic pump 112, an electronic control box 146 is used together with an associated battery and a joystick 150, as shown in FIG. 12.

Each of the control circuits 110A, 110B, 110C and 110D, shown in FIGS. 9, 10, 11 and 12, respectively, utilizes the control circuit 110 of FIG. 8 together with specific additional components which will be discussed in more detail hereinafter. In the interest of brevity, the description of the same or like components thereof will not be repeated.

Specifically, the control circuit 110A of FIG. 9 in addition to adding rotary actuator 140, whose output shaft (not shown per se) is linked to the swashplate trunnion shaft of main pump 112 for controlling the pivoting of the swashplate, and direct hydro-mechanical joystick control, via three-position four-way directional control valve 142A and mechanical lever 144, also adds an auxiliary hydraulic pump 156 in order to supply fluid flow for rotary actuator 140 and control valve 142A. Auxiliary pump 156 is shown as being attached to main pump 112 and driven by the same input shaft 111 as in the manner of most known tandem pump designs. It is also feasible to use existing charge pump 116 to supply the auxiliary fluid flow for rotary actuator 140. Preferably, auxiliary pump 156 draws fluid from reservoir 113 via a filter 158 and conduit 160 and then supplies filtered fluid to control valve 142 and actuator 140 via a conduit 162 which also includes a relief valve 164 connected with reservoir 113. Fluid is exhausted from control valve 142A, to reservoir 113, via a conduit 166. Rotary Actuator 140 is operatively interconnected with control valve 142A via opposed lines or conduits 168, 170 each which includes a cooling orifice 172 and a relief valve 174. Thus, in operation, an operator can control the angular position of rotary actuator 140 or the axial movement of a fluid cylinder, affixed to the main hydrostatic pump trunnion shaft, by adjusting the angular position of valve control lever 144. Lever 144 on valve 142A is actually one type of a single-axis mechanical joystick, wherein the stroking of lever 144 will change both the fluid low rate and fluid flow direction.

Turning now to control circuit 110B of FIG. 10, it differs from control circuit 110A of FIG. 9 mainly in that it utilizes, in place of mechanically controlled directional control valve 142A, a proportional directional control valve 142B and joystick control via control box 146 and a single axis joystick 150A. The utilization of proportional directional control valve 142B minimizes operator control effort in that the operator is only required to use low effort single-axis joystick 150A.

It should be understood, at this time that previously described control circuits 110A (FIG. 9) and 110B (FIG. 10) pertain to the control of only one of the hydrostatic transmissions and drive wheels of a ZTR type vehicle. Control circuit 110C of FIG. 11 is used to control both hydrostatic transmissions 102R (Right), 102L (Left) and the associated right and left hand drive wheels 92, 94, respectively of a ZTR-type vehicle 90. Control circuit 110C, which essentially utilizes a pair of opposed, allochiral or mirror-image control circuits 110B of FIG. 10, labelled 110BR for transmission 102R and 110BL for transmission 102L, uses a single prime mover 91 to drive the opposed transmission input shafts 111 for transmissions 102R, 102L. The independent rotary actuators 140 of transmissions 102R, 102L are controlled via one dual-axis joystick 150B and its associated control box 146 in the manner already previously described.

Continuing now with control circuit 110C of FIG. 12, it differs from the previously described control systems in that, instead of utilizing a directional control valve and a rotary actuator to control the swashplate angle of the main pump via the trunnion shaft, it utilizes a stepper/stepping or servo motor 152 and electronic control box 146 to receive control input signals, from a single-axis joystick 150A, to send pulse output signals to stepper motor 152 for precise angular controlling of the pump swashplate angle via rotation of the trunnion shaft.

It should be understood that instead of using two separate single-axis joysticks 150A, for controlling separate hydrostatic transmissions 102R and 102L, a single dual-axis joystick 150B (FIG. 11) can be utilized. In addition, since some operators favour a steering wheel, it can be used in lieu of dual-axis joystick 150B. For example, a known non-conventional steering wheel (not shown), also denominated as a "steer-by-wire" unit of any desired construction can be utilized. For such usage, at least one sensor (not shown) connected to electronic control box 146 is installed in ZTR vehicle 90 for sensing the angular location of the steering wheel. Depending upon the angular location of the steering wheel, programmable control box 146 will provide commands to one (depending on the desired turning direction of ZTR vehicle 90) of the two proportional directional control valves 142 and de-stroke the hydraulic main pump 112 at the corresponding side of vehicle 90 in order to make the turn. It should be noted that when the steering wheel is in its centered, neutral position, vehicle 90 will proceed in a straight direction, thus, a full speed control mechanism (not shown) is also required. In other words, the turning of the steering wheel, by a human operator, will only result in the de-stroking of one of main hydraulic pumps 112 at the desired side of vehicle 90.

It should also be clear that in the structures associated with the control circuits of the present invention, the control of the pump swashplate angle is achieved via actuator valve control of the swashplate pivot center axis, preferably via the trunnion shaft, at the trunnion shaft end that is located outside of the pump. Thus, a standard pump can be utilized since no changes are required inside the pump itself. Maintenance and repairs are simplified since the external actuator or stepping/servo motor is easily replaced, if necessary, and the integrity of the pump is not compromised.

It is deemed that one of ordinary skill in the art will readily recognize that the several embodiments of the present invention fill remaining needs in this art and will be able to affect various changes, substitutions of equivalents and various other aspects of the invention as described herein. Thus, it is intended that the protection granted hereon be limited only by the scope of the appended claims and their equivalents.

What is claimed is:

1. In combination, a trunnion shaft-controlled swashplate type axial piston hydraulic pump driven by an input shaft and being devoid of any internal servo control, said piston pump further including a charge pump also driven by said input shaft, a reversible power actuator, for controlling the angle of said swashplate, a directional control valve for controlling said reversible power actuator, said reversible power actuator being externally affixed to a housing containing said piston pump, and an auxiliary pump for supplying fluid to said reversible power actuator.

2. The combination of claim 1, wherein said reversible power actuator takes the form of a fluid power rotary actuator.

3. The combination of claim 2, wherein said fluid power rotary actuator is a hydraulic vane type actuator.

4. The combination of claim 1, wherein said reversible power actuator takes the form of a fluid power axial cylinder.

5. The combination of claim 4, wherein said fluid power axial cylinder is a hydraulic cylinder.

6. The combination of claim 1, wherein said reversible power actuator takes the form of a rotary electronic actuator.

7. The combination of claim 6, wherein said rotary electronic actuator is one of a stepper and servo motor.

8. The combination of claim 2, wherein conduits for supplying fluid to said fluid power rotary actuator further include cooling orifices.

9. The combination of claim 8, wherein said conduits further include relief valves for allowing the cooling orifices to be bypassed.

10. The combination of claim 1, wherein a supply conduit supplies fluid from a reservoir to said auxiliary pump, a filter associated with said conduit for filtering the fluid.

11. In combination, a trunnion shaft-controlled swashplate type axial piston hydraulic pump; a reversible power actuator, for controlling the angle of said swashplate, externally affixed to a housing containing said piston pump; a charge pump and an auxiliary pump, wherein the auxiliary pump is for supplying fluid flow to said reversible power actuator.

12. The combination of claim 11, wherein said piston pump further includes an integral directional control valve for controlling said reversible power actuator.

13. The combination of claim 11, wherein said piston pump further includes an integral servo-type directional control valve for controlling said reversible power actuator.

* * * * *